July 4, 1933.    R. L. BLACK    1,916,750
ORNAMENTAL ACCESSORY FOR AUTOMOBILES
Filed June 6, 1931    2 Sheets-Sheet 1
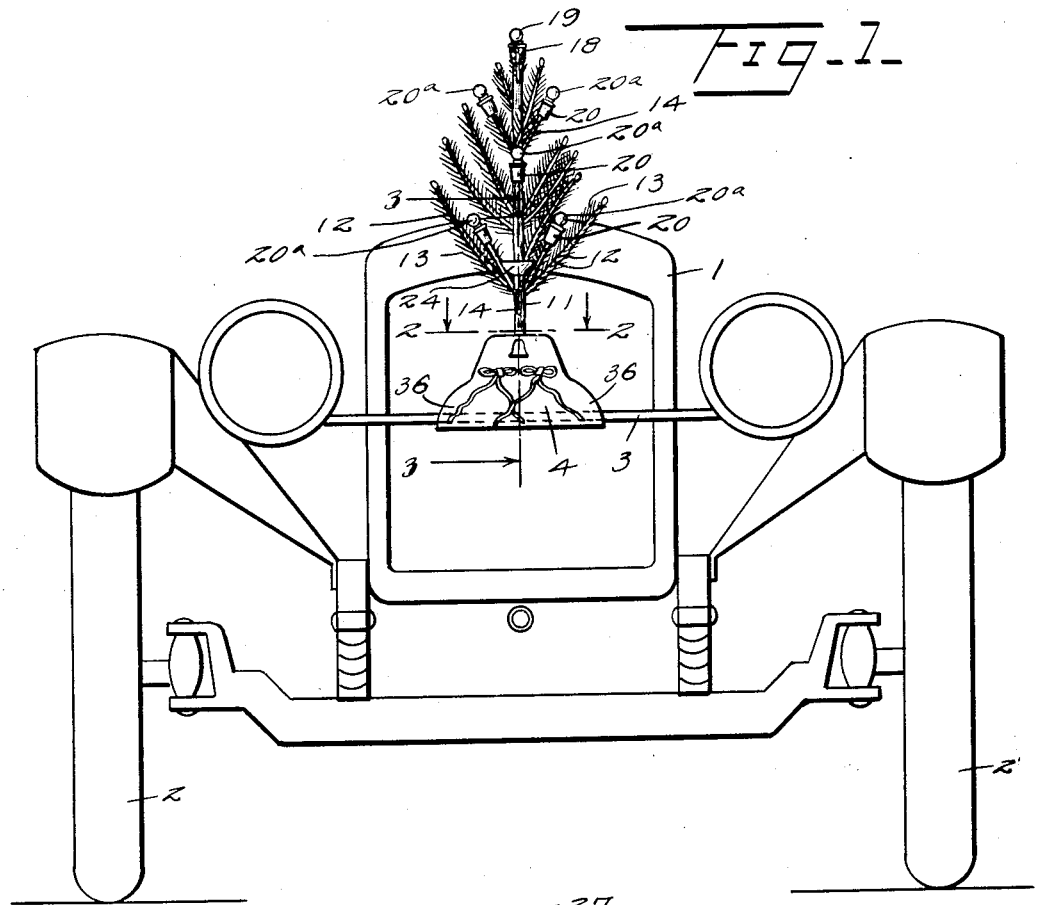
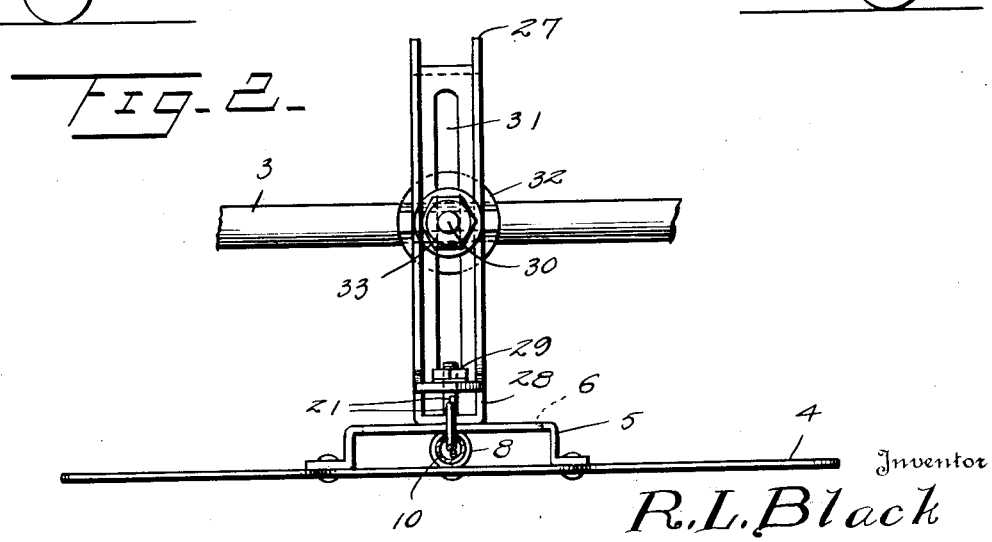
Inventor
R. L. Black
By Watson E. Coleman
Attorney July 4, 1933.  R. L. BLACK  1,916,750
ORNAMENTAL ACCESSORY FOR AUTOMOBILES
Filed June 6, 1931  2 Sheets-Sheet 2
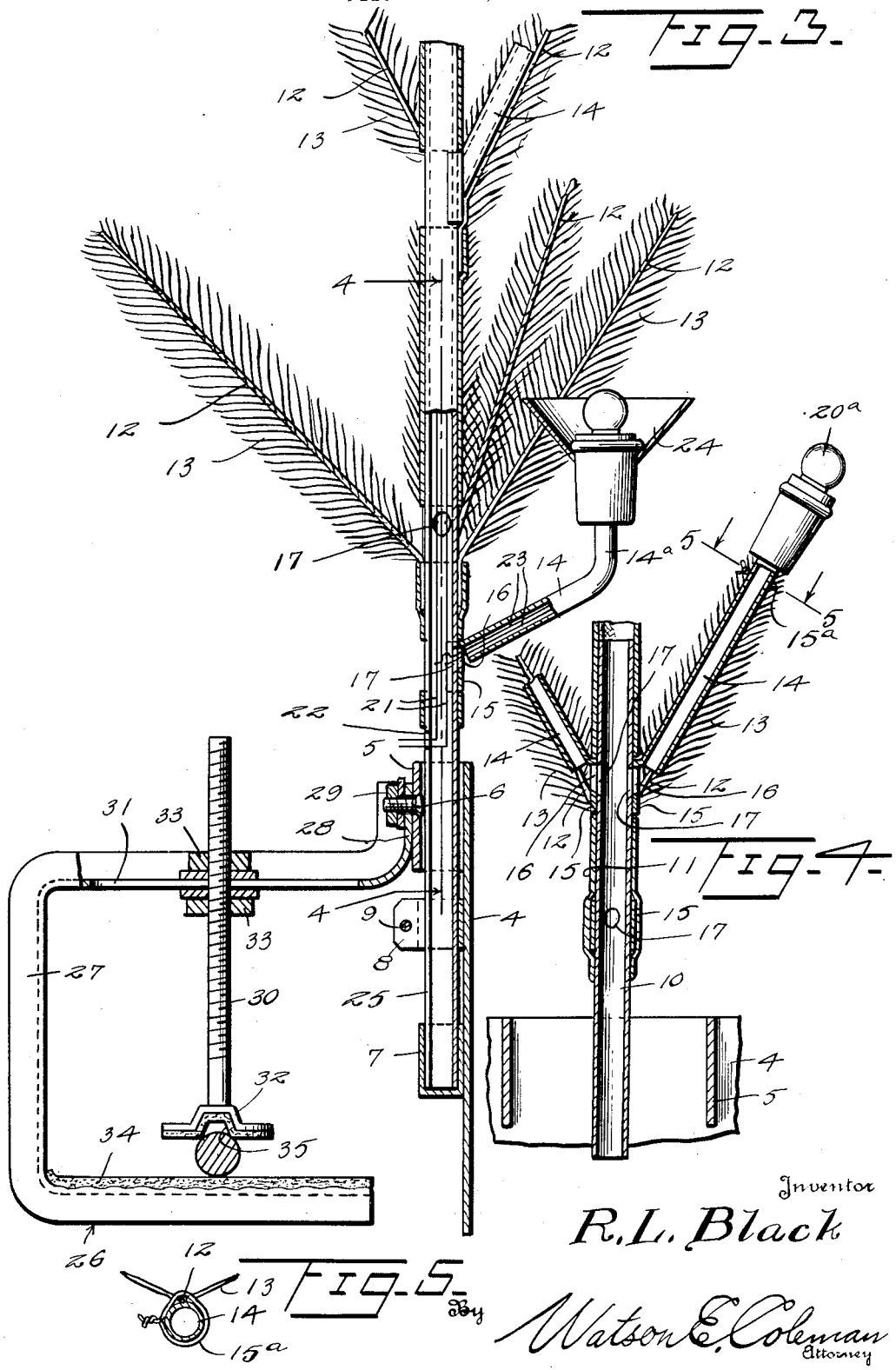
Inventor
R. L. Black
By Watson E. Coleman
Attorney Patented July 4, 1933

1,916,750

UNITED STATES PATENT OFFICE

RAY L. BLACK, OF ORCUTT, CALIFORNIA

ORNAMENTAL ACCESSORY FOR AUTOMOBILES

Application filed June 6, 1931. Serial No. 542,589.

This invention relates to ornamental devices and particularly accessories for automobiles, and has for one of its objects to provide an accessory of this character which shall be in the form of an illuminated Christmas tree, which shall be adapted to be readily secured to an automobile in front of the radiator, and which shall be adapted to be readily manufactured and sold at low cost.
To attain the foregoing and other objects, the nature of which will appear as the description proceeds, the invention comprehends the provision of an ornamental accessory which shall embody a base, means adapted to secure the base to the front bumper or to the brace rod of the front fenders of an automobile, a tube simulating the trunk of a Christmas tree and secured to the base, tubes simulating the branches of the tree and secured to the trunk tube, incandescent electric lamps carried by the trunk and branch tubes, and conductors located within the trunk and branch tubes and connected to the lamps and adapted to be connected to the storage battery or lighting system of the automobile.

The invention further comprehends the provision of an accessory of the character stated wherein the branch tubes shall be connected to the trunk tube in such manner as to permit them to be adjusted inwardly and outwardly with relation to the trunk tube to the end that the width of the tree may be varied at the will of the owner.

The invention further comprehends the provison of an accessory of the character stated wherein the base and the means for attaching it to an automobile shall be connected in a manner to permit the base to be adjusted with respect to the attaching means after the latter has been connected to the automobile, to the end that the Christmas tree may be positioned centrally with respect to the radiator of the automobile.
The invention further comprehends the provision of an accessory of the character stated wherein the base shall be adapted to support the front license tag of the automobile.
The invention is hereinafter more fully described and claimed, and illustrated in the accompanying drawings, wherein:—

Figure 1 is an elevational view illustrating the application of the ornamental accessory to an automobile.

Figure 2 is a sectional view on an enlarged scale taken on the horizontal plane indicated by the line 2—2 of Figure 1.

Figure 3 is a sectional view on an enlarged scale taken on the vertical plane indicated by the line 3—3 of Figure 1.

Figure 4 is a sectional view taken on the vertical plane indicated by the line 4—4 of Figure 3, and Figure 5 is a sectional view taken on the plane indicated by the line 5—5 of Figure 4.

Referring in detail to the drawings, 1 designates the radiator and 2 the front fenders of an automobile, and 3 designates the rod which braces the front fenders and is located in front of the radiator.

The accessory comprises a base 4 which consists of a vertically disposed sheet metal plate. The base 4 may have any desired ornamental contour, may be painted any desired color, and may have any desired design painted or otherwise applied to its front side. A bracket 5 is secured to the rear side of the base 4 and is provided with a horizontal slot 6. The bracket 5 is located near the upper edge of the base 4, and secured to the rear side of the base at a point below the bracket is a vertically arranged socket member 7. A split clamp 8 having a tightening bolt 9, is secured to the rear side of the base 4 between the bracket 5 and socket member 7. The clamp 8 is located directly above the socket member 7, and these parts, which are located centrally between the lateral edges of the base 4, receive the lower end portion of a vertically disposed tube 10. The bracket 5 is offset rearwardly from the base 4 to permit the tube 10 to pass between it and the base. The socket member 7 is closed at its lower end to prevent the downward displacement of the tube 10 with respect to the base 4, and the clamp 8 being tightened by its bolt 9 prevents the upward displacement of the tube with respect to the base.

The tube 10 extends above the base 4.

That portion of the tube 10 located above the base 4 is covered, as shown at 11, with paper or other suitable material made in simulation of the bark of a Christmas tree, to the end that the tube may have the appearance of the trunk of such tree. Wires 12 secured to the tube 10 and provided with members 13 simulating the needles of a Christmas tree, constitute the branches of the tree. Tubes 14 are secured to and extend from the tube 10, and have certain of the branches 13 secured thereto, as shown in Figure 5 at 15a, in order that they may be similar in appearance to the branches of the Christmas tree. The branch tubes 14 are provided at their inner ends with integral arcuate extensions 15 through the medium of which they are flexibly secured to the trunk tube 10, the extensions being welded or soldered to the trunk tube, and being provided with openings 16 registering with openings 17 in the trunk tube. The trunk tube 10 is provided at its upper end with a socket 18 for an incandescent electric lamp 19, and the branch tubes 14 are provided at their outer ends with sockets 20 for similar lamps 20a, the sockets and lamps being similar to those now used on automobiles.

Conductors 21 which extend from the upper end of the trunk tube 10 to and through an opening 22 formed in the tube at a point below the upper edge of the base 4, are connected to the contacts of the socket 18, and are adapted to be connected to the storage battery or lighting system of the automobile. Conductors 23 extending through the branch tubes 14, are secured to the lamps 20a and to the conductors 21. The lowermost of the branch tubes 14 has its outer end curved upwardly and inwardly, as shown at 14a, and is provided with a reflector 24 which directs the rays of its lamp upwardly through the tree, this lamp being stronger than the others in order that it may flood the tree with light.

The trunk tube 10 is split longitudinally, as shown at 25, in order to facilitate the threading of the conductors 21 therethrough and the connection of the conductors 23 with the conductors 21. The branches 13 have flexible wire ribs 12 as previously described, to the end that the branches and branch tubes may be moved together toward or away from the trunk tube 10 and thus permit the width of the tree to be varied. The elements 15 and tubes 14 are joined by a thin body of metal which is bendable and permits movement of the tubes relative to the trunk.

A clamp 26 is employed to secure the base 4 to the brace bar 3. The clamp 26 comprises a U-shaped bar 27 which extends rearwardly from the base 4 and which has its open side facing the base. The bar 27 is adapted to receive the brace bar 3, and the top member thereof is provided with an upwardly directed extension 28 which contacts with the rear side of the bracket 5. A bolt 29 extending through the slot 6 of the bracket 5 and through the bar extension 28, secures the base 4 to the bracket 26. As the slot 6 extends across the base 4, the base may be adjusted laterally with respect to the bracket 26 after the bracket has been secured to the brace bar 3, to the end that the base and tree may be arranged centrally between the lateral sides of the radiator 1. A bolt 30 extends through a slot 31 formed in and extending longitudinally of the top member of the bar 27, and has a block 32 swivelly connected to its lower end. The block 32 is adapted to clamp the brace bar 3 between itself and the corrugated upper side of the bottom member of the bar 27 when the bolt 30 is adjusted downwardly. The bolt 30 is adapted to be adjusted downwardly and secured in adjusted position by nuts 33 mounted thereon and contacting with the upper and lower sides of the top member of the bar 27. The bottom member of the bar 27 and the block 32 are lined, as shown at 34 and 35, respectively, in order to avoid marring the brace bar. The base 4 is provided with openings to permit a license plate to be bolted thereto.

As the slot 31 through which the pressure bolt 30 passes, extends longitudinally of the bracket 26, the bolt may be adjusted longitudinally of the bracket to adapt the bracket for application to a brace bar of any thickness.

The size of the tree will depend upon the size of the automobile on which it is to be used. If desired the tree may be made large enough for use in the home, and when made of this size may be mounted on any well-known or appropriate support. The tree may also, if desired be clamped to the front bumper of an automobile. When applied to an automobile with or without its lamps lit the tree produces a pleasing effect and when its lamps are lit at night such effect thereof is greatly enhanced.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. In a device of the character described, a base, a tubular body vertically disposed upon said base and designed to simulate the trunk of a tree, a plurality of tubular branches each having an arcuate plate flexibly connected to one end, each of said plates being secured to the tubular body, each of said plates having an aperture therein coinciding with the aperture in the tubular body and alining with the adjacent branch tube, an electric incandescent lamp mounted upon the free end of each branch tube, electrical conductors passing through said body and through the apertures therein and in the plates to said tubes for connection with the incandescent elements, and members simulating tree branches connected with the body, certain of said tree branch members being secured to and extending longitudinal of the branch tubes.

2. In a device of the character described, a base, a tubular body vertically disposed upon said base and designed to simulate the trunk of a tree, a plurality of tubular branches each having an arcuate plate flexibly connected to one end, each of said plates being secured to the tubular body, each of said plates having an aperture therein coinciding with the aperture in the tubular body and alining with the adjacent branch tube, an electric incandescent lamp mounted upon the free end of each branch tube, electrical conductors passing through said body and through the apertures therein and in the plates to said tubes for connection with the incandescent elements, and members simulating tree branches connected with the body, certain of said tree branch members being secured to and extending longitudinal of the branch tubes, said branch tubes being swingable relative to the tubular body and said tree branch simulating members being flexibly connected to the body to be folded thereagainst.

In testimony whereof I hereunto affix my signature.

RAY L. BLACK.